United States Patent
Tremblay et al.

(10) Patent No.: US 8,406,384 B1
(45) Date of Patent: Mar. 26, 2013

(54) UNIVERSALLY TAGGED FREQUENT CALL-ROUTING USER QUERIES AS A KNOWLEDGE BASE FOR REUSE ACROSS APPLICATIONS

(75) Inventors: Rèal Tremblay, Outremont (CA); Alina Andreevskaia, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/352,640

(22) Filed: Jan. 18, 2012

(51) Int. Cl.
*H04M 1/64* (2006.01)

(52) U.S. Cl. ............... 379/88.05; 379/67.1; 379/88.06; 704/9; 704/257; 704/270.1; 704/275

(58) Field of Classification Search ............. 379/67.1, 379/88.05, 88.06; 704/9, 257, 270.1, 275
See application file for complete search history.

(56) References Cited

U.S. PATENT DOCUMENTS

| | | | |
|---|---|---|---|
| 7,197,460 B1* | 3/2007 | Gupta et al. | 704/270.1 |
| 2003/0130849 A1* | 7/2003 | Durston et al. | 704/270 |
| 2005/0165607 A1* | 7/2005 | Di Fabbrizio et al. | 704/256 |

* cited by examiner

*Primary Examiner* — Joseph J Nguyen
(74) *Attorney, Agent, or Firm* — Sunstein Kann Murphy & Timbers LLP

(57) ABSTRACT

A computer-implemented method is described for developing query tags for classification of user queries to a call routing application. Multiple user query corpuses are accessed that contain user queries from multiple call routing applications in multiple different vertical domains. A set of frequent user queries are selected which appear in multiple different query corpuses in multiple different vertical domains. From these are developed frequent query tags for semantic classification of the frequent user queries. The frequent query tags are then stored in a query tag database.

20 Claims, 6 Drawing Sheets

| English sample | tag |
|---|---|
| customer service | request-contact |
| bill payment | pay-bill |
| over_due account | request-payment_extension |
| .... | |
| human resources | request-contact_HR |
| to give my bank account number | report-bankInfo |
| connection please | connect-vague |

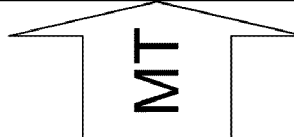
MT

| French Sample | tag | Origin |
|---|---|---|
| encore une maudite panne de courant | report-outage | Genuine |
| pour me faire débrancher du réseau | disconnect-vague | Genuine |
| .... | | |
| service à la clientèle | request-contact | translated |
| paiement de la facture | pay-bill | translated |
| paiement en retard | request-payment_extension | translated |
| développement des ressources humaines | request-contact_HR | Automatically translated |
| pour donner mon numéro de compte de banque | report-bankInfo | Automatically translated |
| branchement au réseau s'il-vous-plaît | connect-vague | Automatically translated |

*FIG. 7*

UNIVERSALLY TAGGED FREQUENT CALL-ROUTING USER QUERIES AS A KNOWLEDGE BASE FOR REUSE ACROSS APPLICATIONS

FIELD OF THE INVENTION

The present invention relates to natural language processing applications, and more specifically, to the development of reusable query tags for call routing applications.

BACKGROUND ART

Natural Language Understanding (NLU) applications involve interactions between humans and machines. The interactions usually are controlled by the machine which asks questions of the users and attempts to determine the intended meaning from the user's answers (expressed in natural language) and then takes actions in response to these extracted meanings.

One important class of NLU applications is known as "call routing" which endeavors to semantically classify a telephone query from a customer to route it to the appropriate set of service agents or relevant specialized automatic system based on a brief spoken description of the customer's reason for the call. Call routing applications classify spoken inputs into a small set of categories for a particular application. Spoken inputs such as "I have a problem with my bill," "Check my balance," "Did you get my payment?" might all be mapped to a "Billing" category. Since people express these requests in many different ways, call routers are typically implemented as a statistical classifier which is trained on a labeled corpus—that is, a set of spoken requests and their classifications.

FIG. 1 illustrates the functional arrangement of a typical call routing system. Input speech from the caller is translated into a corresponding text string by an Automated Speech Recognition (ASR) Module 101. The ASR text is output into an NLU semantic classification component known as a Statistical Router 102. The Statistical Router 102 models the NLU task as a statistical classification problem in which the ASR text corresponding to an utterance is assigned to one or more of a set of predefined user intents, referred to as "call routes." The Statistical Router 102 typically has an unacceptably high error rate (10-30% classification error rates are commonly reported in deployed applications), and thus a rejection mechanism is implemented to only retain those route hypotheses which are most likely to be correct. Therefore, another separate classifier—Confidence Engine (CE) 103—is used to produce confidence scores based on both acoustic and NLU features to determine the highest ranked N hypotheses (typically 3-5) output from the Statistical Router 102. A Route Reordering Component 104 then reorders the route hypotheses according to their overall confidence as determined by the CE 103. The best scoring route hypothesis is sent to Threshold Decision Module 105 which accepts the hypothesis if its confidence score is above an accept threshold. The value of the accept threshold is chosen so that the system satisfies one or more operating constraints such as an upper bound on the False Accept Rate (FAR) (typically 1-5%). Further discussion of an NLU-based statistical router system is set forth, for example, in U.S. Pat. No. 7,206,389, which is incorporated herein by reference.

To create a new call routing application, a new training corpus must initially be developed based on the specific needs of the new application. Different applications have different call routing classifiers based on their own specific needs. There is usually no simple many-to-one or one-to-many mapping from routers of one application to another. More specifically, the tags used to classify the collected user queries for any one given customer are redefined for each customer and there is no systematic reuse across different customers.

It has been proposed to pre-build call routers for a given vertical family of applications. That is, the classification tags for a given vertical domain might be pre-defined and then user query examples could be automatically classified with those vertical-dependent pre-defined query tags. This would allow deployment of bootstrapped call routers for that defined vertical domain. But one limitation of this vertical-silo approach is the failure to take into account that the boundaries between different verticals are not particularly well-defined, and in fact, many call queries actually appear in many different verticals, e.g., change-address, account-information, lost-bill, etc. In other words, the vertical-silo approach is limited to a given specific vertical and does not take advantage of the user query samples describing the same concept in other verticals.

SUMMARY OF THE INVENTION

Embodiments of the present invention are directed to a computer-implemented method for developing query tags for classification of user queries to a call routing application. Multiple user query corpuses contain user queries from multiple call routing applications in multiple different vertical domains. A set of frequent user queries are selected which appear in multiple different query corpuses in multiple different vertical domains. From these are developed frequent query tags for semantic classification of the frequent user queries. The frequent query tags are then stored in a query tag database, and an ontology is developed or modified that characterizes the relationships of the tags to objects and hierarchical structure within the ontology.

In further embodiments, the user query corpuses may be accessed again to select another set of common user queries that appear in different query corpuses in a single common vertical domain. From these, common query tags can be developed for semantic classification of the common user queries. The common query tags are then stored in the query tag database, and the ontology is modified.

Similarly, the user query corpuses can be accessed and a set of widespread user queries not previously selected can be selected. For example, a set of widespread user queries may be selected that appear multiple times in a single corpus in a single common vertical domain, and these may be developed as a set of widespread query tags for semantic classification of the widespread user queries. The widespread user queries can be of two different kinds: (1) queries specific to the given application, and/or (2) queries that could be found in another new application, but were not found to belong to many already existing corpus simply because of the limited number of those. The widespread query tags are then stored in the query tag database, and the ontology is modified.

The query tags from such a universal query tag database may be automatically assigned to user queries from a new call routing application. Embodiments of the present invention may also develop or modify a call routing ontology for the new application that organizes the query tags for the new application in a class hierarchy reflecting associated semantic concepts. The new call routing application may be in a vertical domain already represented in the user query corpuses, and the assigned query tags may be obtained by intersecting the query tags in the query tag database with the user queries in the user query corpuses in the vertical domain of the new call routing application. A new application corpus can be partially tagged by finding the queries of that application that can be found in the existing universal query tag database. This can be used to train a first bootstrap call routing for that new application, and/or to speed the tagging of this new application corpus, as many samples are already covered by the universal query tag database. Since the query tags of the query tag database are organized in a hierarchical structure (i.e., the ontology), this structure will be readily available for the new application.

Embodiments of the present invention also include the building of call routers for the different vertical domains represented in the universal query tag database using the user queries common between the universal query tag database and the ensemble of samples from all corpora in the given vertical domain. Those vertical-specific queries have by definition a tag from the universal query tag database. Since the tags of the database are organized in a hierarchical structure, this structure will be readily available for the new application.

The selected samples can then be used to train a new vertical call router that can be used for a given new application even though there may not be any existing user queries available for this new application. Since the query tags of the query tag database are organized in a hierarchical ontology structure, that structure also will be readily available for the new application. An existing system can then also be improved by adding a further collection of user queries and then tagging those queries. The number of samples needed will be far smaller than for starting from scratch since all vertical samples are already available.

In a further embodiment, the user queries and the query tags may be in a first language, and the system automatically translates the user queries into a second language and stores the translated user queries with the frequent associated query tag in a call routing database for a call routing application in the second language. Once the query tag ontology is available in a new language, it can be used as in the source language. A new applications corpus in the in the new language can be partially tagged by finding the queries of that application that can be found in the universal query tag database. This can be used to train a first bootstrap call routing for that new application or simply to speed the tagging of this new application corpus, as many samples are already covered.

Vertical routers can be built in a target language, even without any body of existing user queries in the new language, simply by taking the vertical samples as found in the universal query tag database, taking their translation, and keeping the query tags from the source language universal query tag database. Those can then be used to train a call router in the target language that can be used for new applications.

The stored query tags can be used in a clustering algorithm for a call steering application; for example, in a user tagging interface for a call steering application. The stored query tags also can be used to build a statistical language model for audio clustering in an automatic speech recognition application. And the stored query tags also can be used as an input for injection of soft knowledge in a call steering application.

BRIEF DESCRIPTION OF THE DRAWINGS

FIG. 7 shows an example of translating existing call routing user queries in one language into a new set of call routing queries in another different language.

DETAILED DESCRIPTION OF SPECIFIC EMBODIMENTS

Embodiments of the present invention are directed to re-usable universal call query tags (also known as "destinations") for classification of user call-routing queries. The most frequent call-routing user queries across a large number of call-routing corpora are taken (a corpus is the set of user queries for a given customer). Then progressive constraints are imposed such that commonalities are modeled first, and then the constraints are relaxed step by step towards including unique customer samples. At each step, the query tags are assigned to new call queries and a query ontology is developed that presents an abstract description of the call query and query tag concepts and their relations.

Figure 1:
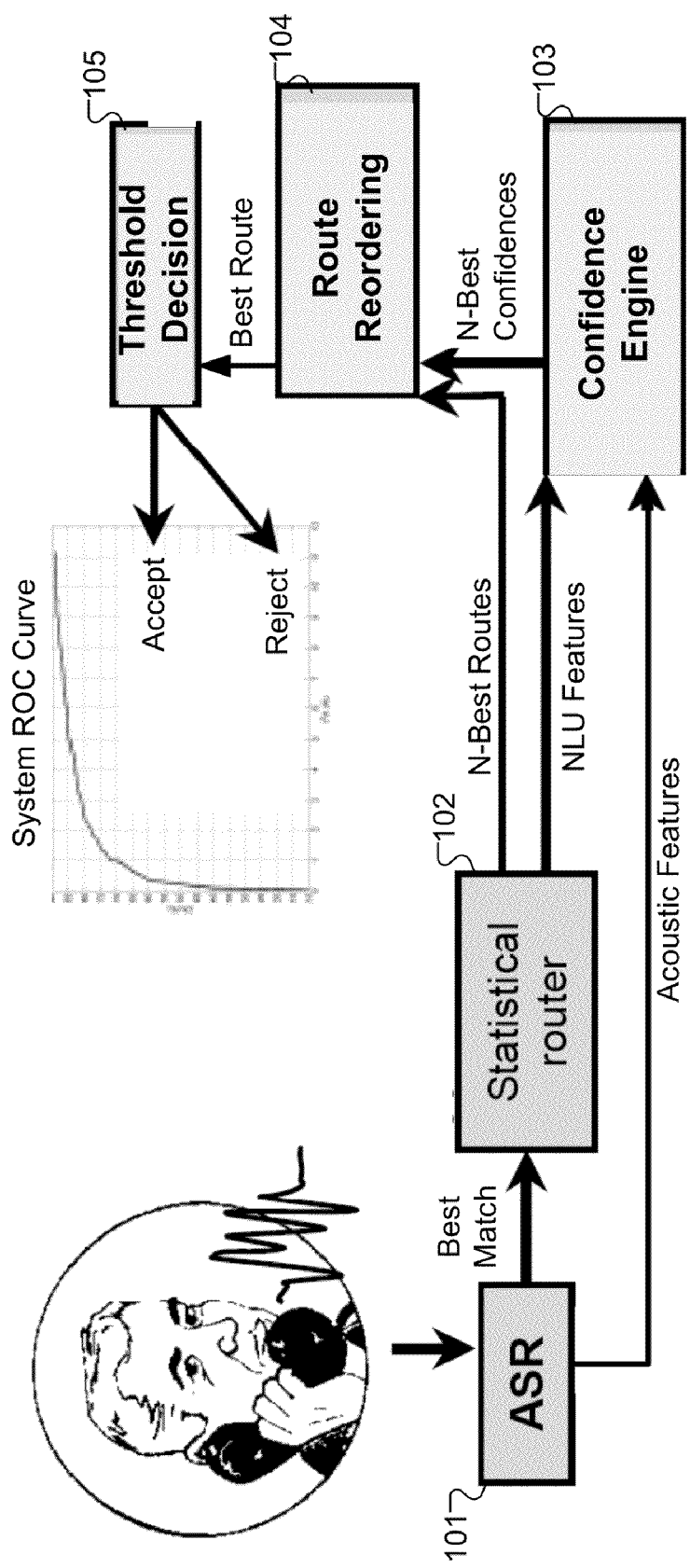
FIG. 1 illustrates the functional arrangement of a typical call routing system.
Figure 2:
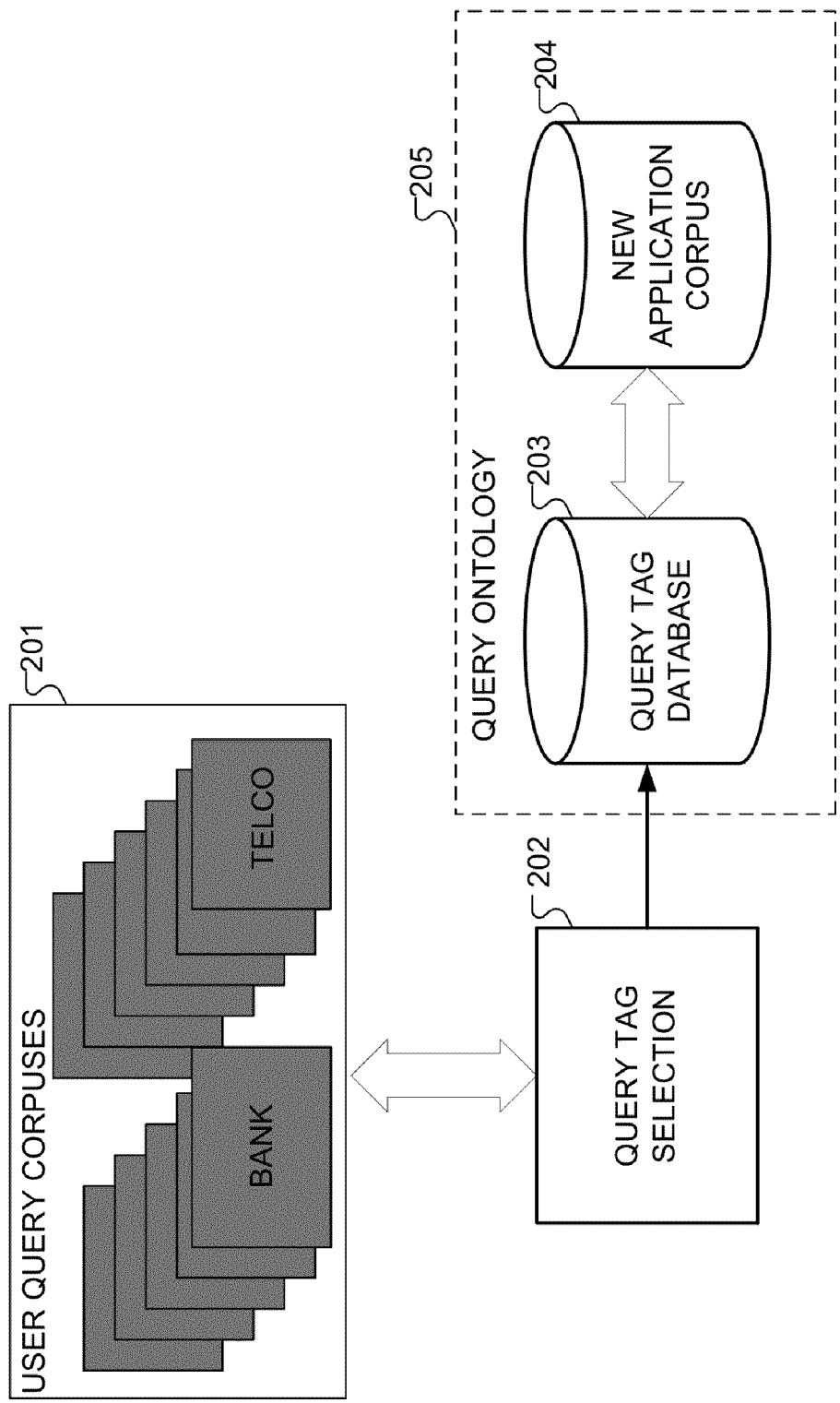
FIG. 2 shows an example of a query tag arrangement according to one specific embodiment of the present invention.
Figure 3:
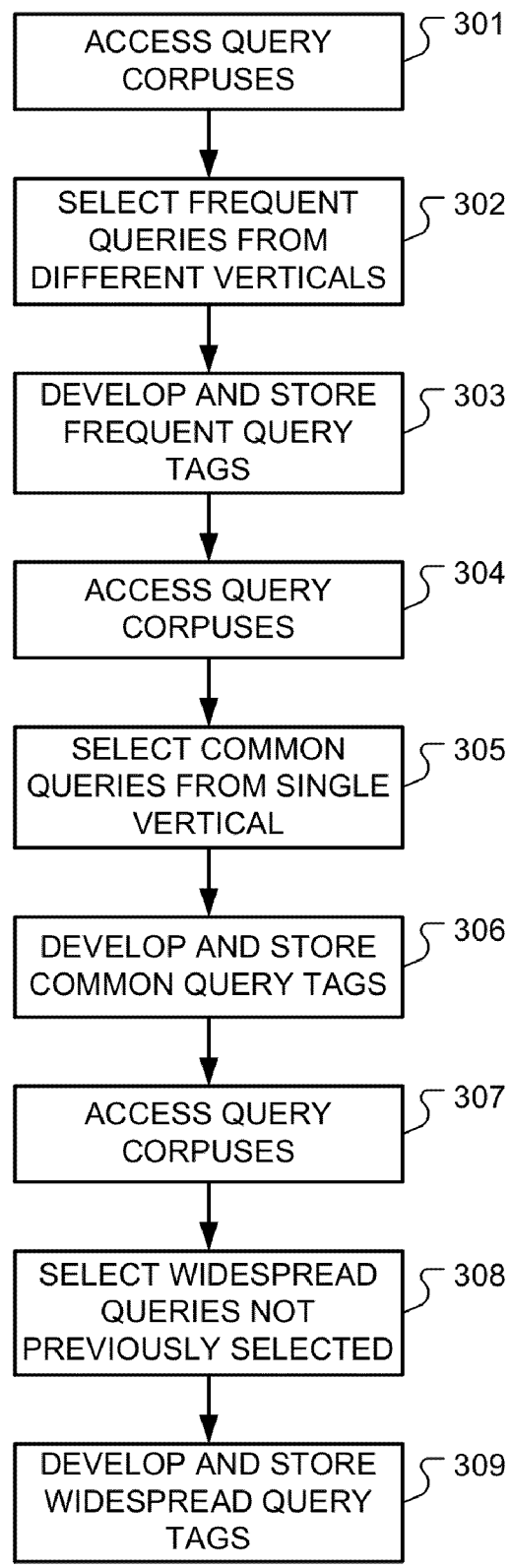
FIG. 3 shows various functional steps in a process for developing a set of universal re-usable query tags according to an embodiment.

FIG. 2 shows an example of a query tag arrangement and FIG. 3 shows various functional steps in a process for developing a set of universal re-usable query tags according to an embodiment of the present invention. Initially, step 301, query tag selection module 202 applies a first level constraint and accesses multiple user query corpuses 201 that contain user queries from multiple call routing applications in multiple different vertical domains. The query tag selection module 202 then selects a set of most frequent call-routing user queries, step 302, which appear in multiple different query corpuses 201 in multiple different vertical domains (e.g., telco, telco-cell, financial, financial-bank, etc.). From these, the query tag selection module 202 develops frequent query tags for semantic classification of these frequent user queries, step 303. The following table shows some examples:

| User Query | Query Tag |
|---|---|
| "change of address" | change-address |
| "address change" | change-address |
| "balance" | enquire-balance |
| "account balance" | enquire-balance |
| "billing question" | enquire-billing |
| "question" | enquire-vague |
| "service representative" | request-contact |
| "operator" | request-contact |
| "need to speak to a representative" | request-contact |
| "customer service" | request-contact |

The query tag selection module 202 stores the frequent query tags in a query tag database 203 and a query ontology 205 is developed that reflects the relationships between the user call queries in the UTHR (Universally Tagged High-Runners) corpus 204 and the query tags in the query tag database 203.

Following this first level of constraint, the query tag selection module 202 may perform further rounds in which the constraint is progressively relaxed. Accordingly, the query tag selection module 202 again accesses the user query corpuses 201, step 304, to select a set of common user queries that appear in different query corpuses 201 in a single common vertical domain, step 305. This step introduces the call query samples and their tags that are common to many customers within a given vertical domain. From these, the query tag selection module 202 develops common query tags, step 306, for semantic classification of the common user queries. The following table shows some examples of such common query tags for the specific vertical domain of consumer products:

| User Query | Query Tag |
|---|---|
| "order the product" | order-product |
| "get a refund" | request-refund |
| "stop my order" | cancel-order |
| "to change my order" | change-order |
| "order my order" | enquire-order |
| "wanna place an order" | order-vague |
| "need a copy of an invoice" | request-bill_copy |
| "didn't receive order" | report-order_missing |
| "return products" | return-product |
| "question about order" | enquire-order |

The query tag selection module 202 then adds the common query tags to the query tag database 203 and augments the query tag ontology 205.

Next, the query tag selection module 202 can further relax the constraint level to again access the query corpuses 201, step 307, and select a set of widespread user queries that were not previously selected in earlier rounds, step 308. From these the query tag selection module 202 develops widespread query tags, step 309 for semantic classification of the widespread user queries. The following table shows some examples of such widespread query tags:

| User Query | Query Tag |
|---|---|
| "reservations" | book-vague |
| "resort reservation" | book-resort |
| "order water" | order-water |
| "when is my next delivery" | enquire-delivery |
| "I need water" | order-water |
| "update my account details" | change-account_info |
| "a question about the product" | enquire-product |
| "when will I receive my order" | enquire-order |
| "buy a laptop" | order-computer_laptop |
| "printer not working" | report_problem-printer |

The query tag selection module 202 then adds the widespread query tags to the query tag database 203 and further augments the query tag ontology 205.

A UTHR arrangement as described above can be used to generate a new call-router training corpus for any vertical at any level in the vertical hierarchy. One approach would be to take all call query samples in all the query corpora from a given vertical and intersect them (i.e. find the same transcriptions) with the UTHR. The resulting set contains the vertical-specific UTHRs and can be used to train a vertical call router. Alternatively, one could take all the call query samples in all the corpora from a given vertical and intersect them (i.e. find the same transcriptions) with the UTHR, and then take the set of query tags assigned to those call query samples and collect all the call query samples in the UTHR that have the same query tags. This takes advantage of the fact that a given query tag—e.g. change-address—is common to many corpora in many verticals.

Figure 4:
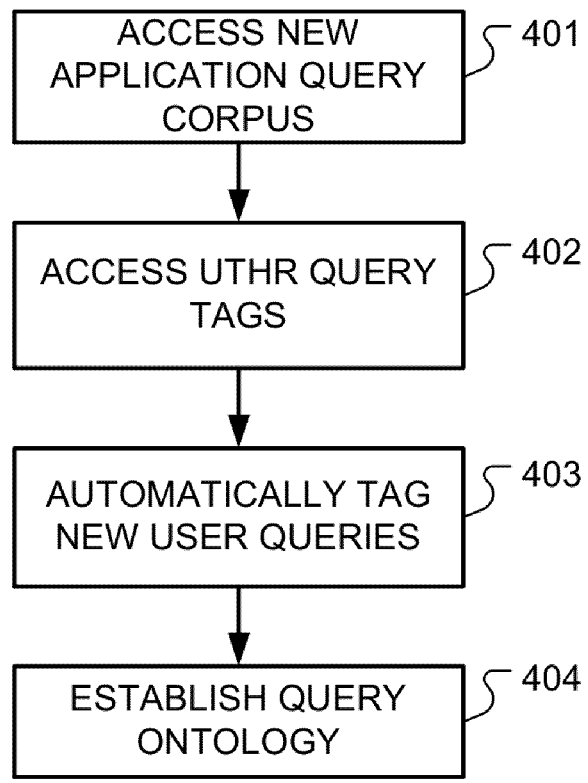
FIG. 4 shows various functional steps in a process for developing a new query tag arrangement for a new application.

FIG. 4 shows various functional steps in one specific process for developing a new query tag arrangement for a new call routing application. Specifically, the call query samples in the query corpus for the new application are accessed, step 401, as are the UTHR query tags, step 402. All the new call query samples that appear in the UTHR can then be automatically tagged, step 403, and a query ontology established for the new call routing application, step 404. This automatically tags a portion of the call query samples with zero effort. A work station tagging interface can use a single button to automatically tag all call query samples in a new application query corpus which are already defined in UTHR. For the classification of the remaining call queries, system suggestions may be provided.

Figure 5:
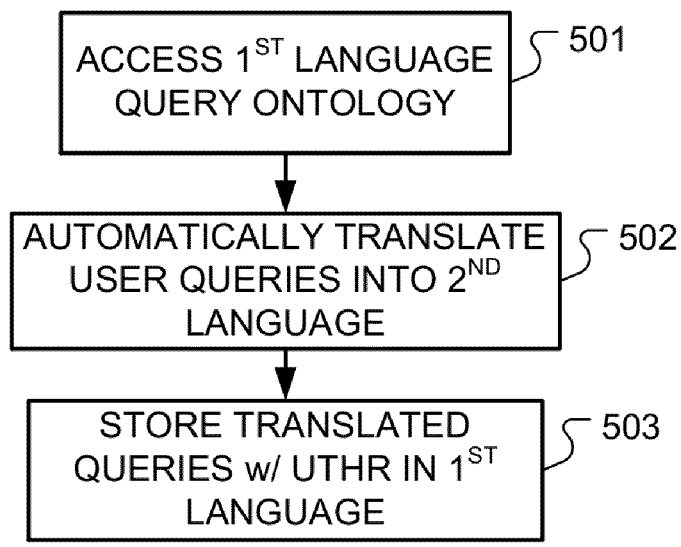
FIG. 5 shows various functional steps in a process for translating an existing query tag arrangement in one language to a new query tag arrangement in another different language.

Another advantage of the UTHR approach is that it can be machine translated into another language and used to develop a call routing application in the second language. FIG. 5 shows various functional steps in a process for translating an existing query tag arrangement in one language to a new query tag arrangement in another different language. The UTHR query ontology for the first language—user queries and the query tag—is accessed, step 501. Then the user queries can be automatically translated into the target second language, step 502. The translated user queries and the frequent query tags can be stored, step 503, as a query ontology for a call routing application in the second language.

FIG. 7 shows an example of translating existing call routing user queries in one language into a new set of call routing queries in another different language. If genuine call query samples also are available in the target second language, these can be simply added with the query tags from the same UTHR set. If new query tags also need to be introduced for the genuine call query data, these can added to the overall UTHR tag set and the query ontology augmented accordingly. UTHR tags are in that sense universal and re-usable even across multiple different languages.

The query ontology provides an abstract representation and organization for the concepts (objects) covered by the query tags in the query tag database. This helps ensure that new query tags that might be assigned to new call query samples will be consistent with the tags already present in the UTHR query ontology. For example, call queries such as "I want to pay by credit card" and "I want to pay by debit card" will have similar tags, pay-paymentMethod_creditCard and pay-paymentMethod_debitCard. The query ontology also facilitates the mapping of fine-grained UTHR tags to more general application tags. For example, query tags that refer to different kinds of internet connections—dialup, broadband, ads1, etc.—can be mapped to more general concepts such as internet. The query ontology can also be used to generate new call query samples using the samples for other concepts under the same super-class in the hierarchy.

Figure 6:
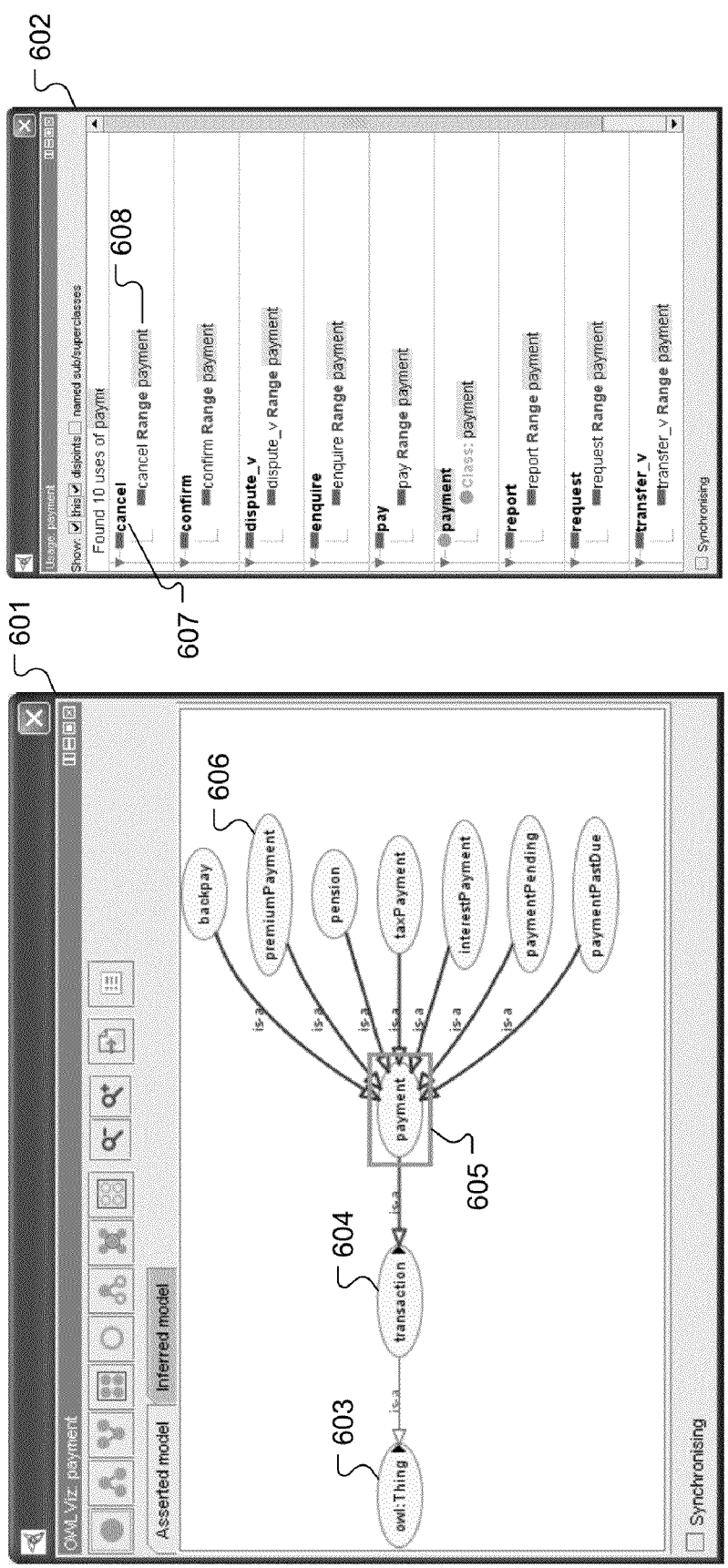
FIG. 6 A-B shows a query tag ontology arrangement according one embodiment of the present invention.

FIG. 6 A-B shows a query ontology arrangement that was created in parallel with the UTHR tagging according one specific embodiment of the present invention where the query ontology follows an action-object tag structure.. In this case, creation of the query ontology used a Protégé ontology editor (http://protege.stanford.edu/) to create an XML file. Object tags are organized into a class hierarchy 601 as shown in FIG. 6A where the object owl:thing 603 is a general class object, of which the object transaction 604 is a specific example, and also a general class object, of which the object payment 605 is a specific example. Actions in turn are represented as properties of these objects. FIG. 6B shows an example of the object property actions 602 of which most are general actions such as cancel, enquire, request, report, etc. Some actions 602 may be more domain-specific such as refill, connect, unbar, etc. The actions 602 define a relatively small number of tags (e.g., 83 in one specific arrangement that covers 32 corpora from 14 vertical domains) while the object hierarchy 601 defines a (very) large number of objects 603, 604, 605. Because the objects 603, 604, 605 are fine-grained, they provide a better mapping to application-specific query tags. The hierarchical structure of the objects 603, 604, 605 facilitates mapping to the query ontology.

A UTHR arrangement as described above defines query tags that are reusable across multiple different application in different vertical domains. By construction, the UTHR query tags optimally capture the commonalties across different customers or different vertical domains. Vertical query corpora and routers that use this commonality are a simple and natural by-product of the approach.

A semantic classification system such as a call router can be built using little or no manual transcription of in-domain audio data. This helps make development of semantic classification systems cost- and time-effective for deployment in smaller applications. It also avoids the cost of manual annotation of the audio data and decreases the amount of manual work needed and implicitly the deployment time to start operating a given new system.

An arrangement using UTHR tagging as described above can be useful in various specific tasks associated with call steering applications. For example, UTHR tagging can be used to drive the clustering done for a user tagging interface for call steering application such as the one described in U.S. patent application Ser. No. 13/246,801, "Call Steering Data Tagging Interface with Automatic Semantic Clustering" filed on Sep. 27, 2011 and incorporated herein by reference. For example, this may be based on building three call routers with the UTHR, one with the full UTHR tags, one with the action part of the tags, and one with the object part of the tags. And similarly UTHR tagging can be used for the clustering algorithm itself for a call steering application such as the one described in U.S. patent application Ser. No. 12/894,752, "Training Call Routing Applications by Reusing Semantically-labeled Data Collected for Prior Applications" filed on Sep. 30, 2010 and incorporated herein by reference. Again this could be based on an approach using three UTHR call routers as per above. The UTHR tagging also can be used to build a statistical language model (SLM) for audio clustering in an ASR application such as is described in U.S. patent application Ser. No. 12/974,638, "Sample Clustering to Reduce Manual Transcriptions in Speech Recognition System" filed on Dec. 21, 2010 and incorporated herein by reference. And the UTHR tagging also can be used as input for injection of soft knowledge in a call steering arrangement such as is described in U.S. patent application Ser. No. 12/422,671, "Knowledge Re-Use for Call Routing" filed on Apr. 13, 2009 and incorporated herein by reference.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

For example, a pseudo code representation of one specific approach for creating a UTHR query tag arrangement might be set forth as follows:

```
Process Create_UTHR
    access user_query_corpuses
    select frequent_user_queries; #appear in different query
        corpuses in different vertical domains#
    develop frequent_query_tags
    store frequent_query_tags, query_tag_db
    access user_query_corpuses
    select common_user_queries; #appear in single common
        vertical domain#
    develop common_query_tags
    store common_query_tags, query_tag_db
    access user_query_corpuses
    select widespread_user_queries; #not selected previously#
    develop widespread_query_tags
    store widespread_query_tags, query_tag_db
```

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

A described "process" is the performance of a described function in a computer using computer hardware (such as a processor, domain-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "process" we do not necessarily require a schedulable entity, although, in some embodiments, a process may be implemented by such a schedulable entity. Furthermore, unless the context otherwise requires, a "process" may be implemented using more than one processor or more than one (single- or multi-processor) computer and it may be may be an instance of a computer program or an instance of a subset of the instructions of the computer program.

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware based computer processor to develop query tags for classification of user queries to a call routing application, the method comprising:
   accessing a plurality of user query corpuses containing user queries from a plurality of call routing applications in a plurality of different vertical domains;
   selecting a set of frequent user queries that appear in a plurality of different query corpuses in a plurality of different vertical domains;
   developing frequent query tags for semantic classification of the frequent user queries; and
   storing the frequent query tags in a query tag database;
   wherein the user queries and the query tags are in a first language, and the method further comprises:
   automatically translating the user queries into a second language; and
   storing the translated user queries with the frequent query tags in a call routing database for a call routing application in the second language.

2. A method according to claim 1, further comprising:
   accessing the plurality of user query corpuses;
   selecting a set of common user queries that appear in a plurality of different query corpuses in a single common vertical domain;
   developing common query tags for semantic classification of the common user queries; and
   storing the common query tags in the query tag database.

3. A method according to claim 2, further comprising:
   accessing the plurality of user query corpuses;
   selecting in an computer process a set of widespread user queries not previously selected;
   developing widespread query tags for semantic classification of the widespread user queries; and
   storing the widespread query tags in the query tag database.

4. A method according to claim 1, further comprising:
   automatically assigning query tags from the query tag database to user queries from a new call routing application.

5. A method according to claim 4, further comprising:
   establish a call routing ontology for the new application organizing the query tags for the new application in a class hierarchy reflecting associated semantic concepts.

6. A method according to claim 4, wherein the new call routing application is in a vertical domain represented in the user query corpuses, and wherein the assigned query tags are obtained by intersecting the query tags in the query tag database with the user queries in the user query corpuses in the vertical domain of the new call routing application.

7. A method according to claim 1, further comprising:
   using the stored query tags in a clustering algorithm for a call steering application.

8. A method according to claim 7, further comprising:
   using the clustering algorithm in a user tagging interface for a call steering application.

9. A method according to claim 1, further comprising:
   using the stored query tags to build a statistical language model for audio clustering in an automatic speech recognition application.

10. A method according to claim 1, further comprising:
    using the stored query tags as an input for injection of soft knowledge in a call steering application.

11. A system for developing query tags for classification of user queries to a call routing application, the system comprising:
    a plurality of user query corpuses containing user queries from a plurality of call routing applications in a plurality of different vertical domains;
    a query tag selection module for accessing the user query corpuses to select a set of frequent user queries that appear in a plurality of different query corpuses in a plurality of different vertical domains to develop frequent query tags for semantic classification of the frequent user queries; and
    a query tag database for storing the frequent query tags;
    wherein the user queries and the query tags are in a first language, and the system further automatically translates the user queries into a second language and stores the translated user queries with the frequent query tags in a call routing database for a call routing application in the second language.

12. A system according to claim 11, wherein the query tag selection module further accesses the user query corpuses to select a set of common user queries that appear in a plurality of different query corpuses in a single common vertical domain to develop common query tags for semantic classification of the common user queries and store the common query tags in the query tag database.

13. A system according to claim 12, wherein the query tag selection module further accesses the user query corpuses to select a set of widespread user queries that appear in a plurality of different query corpuses in a single widespread vertical domain to develop widespread query tags for semantic classification of the widespread user queries and store the widespread query tags in the query tag database.

14. A system according to claim 11, wherein the query tags from the query tag database are automatically assigned to user queries from a new call routing application.

15. A system according to claim 14, further comprising:
    a call routing ontology for the new application that organizes the query tags for the new application in a class hierarchy reflecting associated semantic concepts.

16. A system according to claim 14, wherein the new call routing application is in a vertical domain represented in the user query corpuses, and wherein the assigned query tags are obtained by intersecting the query tags in the query tag database with the user queries in the user query corpuses in the vertical domain of the new call routing application.

17. A system according to claim 11, further comprising:
    a clustering algorithm module of a call steering application that uses the stored query tags.

18. A system according to claim 17, further comprising:
    a user tagging interface of a call steering application that uses the clustering algorithm.

19. A system according to claim 11, further comprising:
    a statistical language model for audio clustering in an automatic speech recognition application derived from the stored query tags.

20. A system according to claim 11, further comprising:
    a soft knowledge input of a call steering application that receives the stored query tags.

* * * * *